(12) United States Patent  
Cook

(10) Patent No.: US 6,499,283 B1
(45) Date of Patent: Dec. 31, 2002

(54) CROP CONDITIONING SYSTEM WITH LOBED ROLLERS

(76) Inventor: Ivan J. Cook, 333 E. Feedville Rd., Hermiston, OR (US) 97838-7149

( * ) Notice: Subject to any disclaimer, the term of this patent is extended or adjusted under 35 U.S.C. 154(b) by 0 days.

(21) Appl. No.: 09/627,489

(22) Filed: Jul. 28, 2000

(51) Int. Cl.$^7$ .............................................. A01D 61/00
(52) U.S. Cl. ............................ 56/16.4 B; 56/16.5
(58) Field of Search .................. 56/1, DIG. 1, 16.4 R, 56/16.4 B, 16.4 A, 16.5, 504, DIG. 23, 14.1; 460/31, 32; 100/70 A, 155 R, 176, 164, 155, 169, 171

(56) References Cited

U.S. PATENT DOCUMENTS

| | | | |
|---|---|---|---|
| 2,698,170 A | 12/1954 | Foley | |
| 2,921,426 A | 1/1960 | Heth | |
| 2,947,130 A | 8/1960 | Everett | |
| 2,974,462 A | 3/1961 | Heth | |
| 2,989,829 A | 6/1961 | Heth et al. | |
| 3,007,297 A | 11/1961 | Halls et al. | |
| 3,043,073 A | 7/1962 | Bornzin | |
| 3,101,578 A | 8/1963 | Johnston | |
| 3,488,929 A | * 1/1970 | Hale | 56/1 |
| 3,712,034 A | * 1/1973 | Praca | 56/1 |
| 3,732,670 A | * 5/1973 | Milliken et al. | 56/1 |
| 3,890,770 A | * 6/1975 | Milliken | 56/1 |
| 4,127,979 A | * 12/1978 | Hoch | 56/1 |
| 4,265,076 A | 5/1981 | Krutz | |
| 4,580,395 A | 4/1986 | Castoldi | |
| 4,860,528 A | * 8/1989 | Seymour | 56/16.4 R |
| 4,910,947 A | * 3/1990 | Seymour | 56/16.4 R |
| 5,142,848 A | * 9/1992 | Seymour | 56/1 |
| 5,152,127 A | 10/1992 | Koegel et al. | |
| 5,396,755 A | 3/1995 | Arnold | |
| 5,419,106 A | * 5/1995 | Gemelli | 56/16.4 B |
| 5,423,165 A | 6/1995 | Walch et al. | |

FOREIGN PATENT DOCUMENTS

SU 1447312 * 12/1988 .............. 56/16.4 R

OTHER PUBLICATIONS

Heston Self–Propelled Windrowers Models 8100, 8200, 8400, date 1993.
John Deere Windrowing Equipment, Date 1995.
MacDon 960 Premier 2900 Series Self–Propelled Windrowers, Date 1995.
Hesston Sickle Type Mower Conditiioners Models 1170, 1160, 1150, 1130, 1120, & 1110, Date 1993.
New Holland Speedrower Self Propelled Windrowers 2450 & 2550, 1995.

* cited by examiner

Primary Examiner—Robert E. Pezzuto
Assistant Examiner—Árpád Fábián Kovács
(74) Attorney, Agent, or Firm—Wells St. John P.S.

(57) ABSTRACT

A roller for a crop conditioning system having a roller body with a compressible base mat, with a side of the base mat including a plurality of generally arcuate recessed areas and an plurality of raised areas adjacent the recessed areas, with each raised area including one or more longitudinally oriented slits therein.

6 Claims, 6 Drawing Sheets

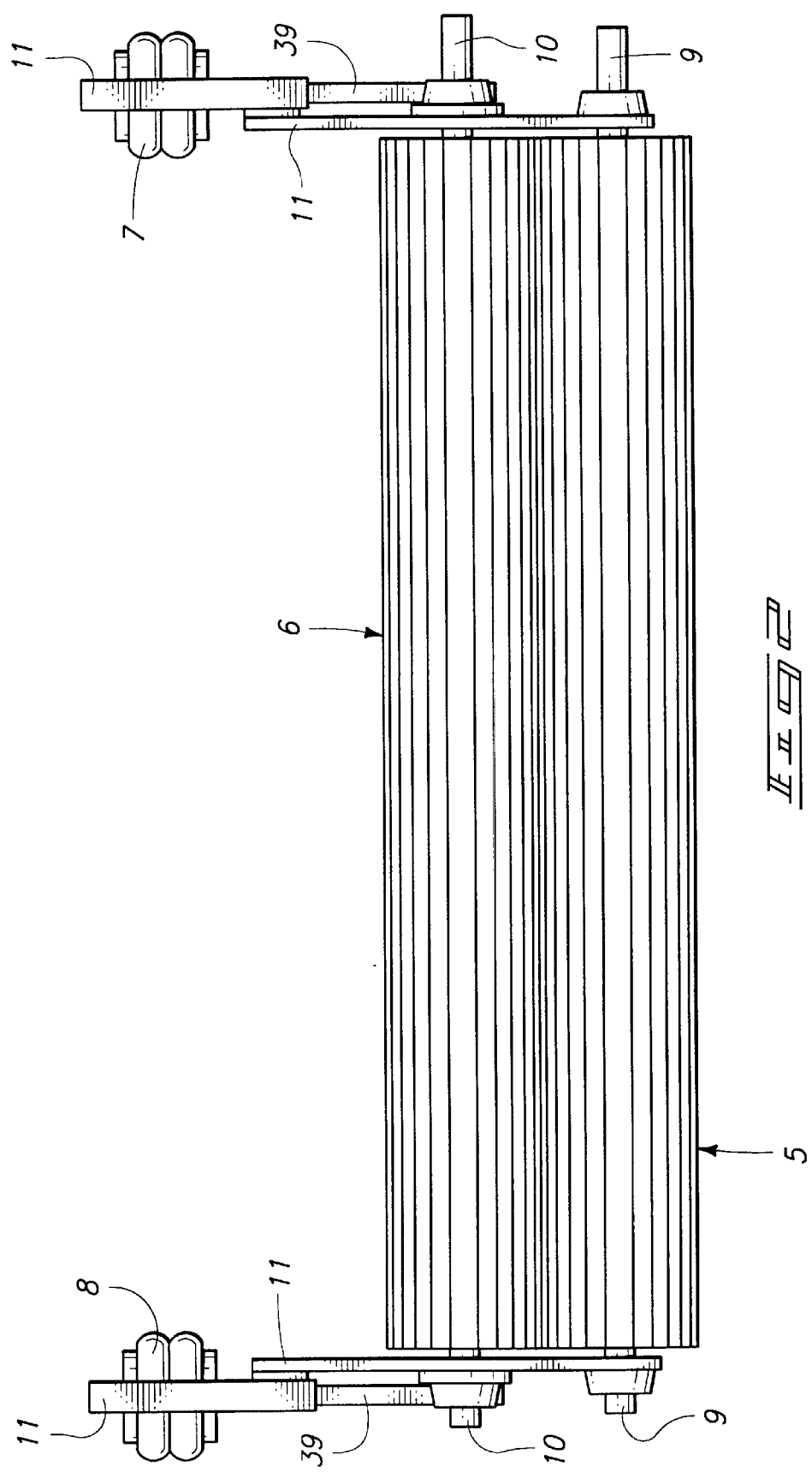

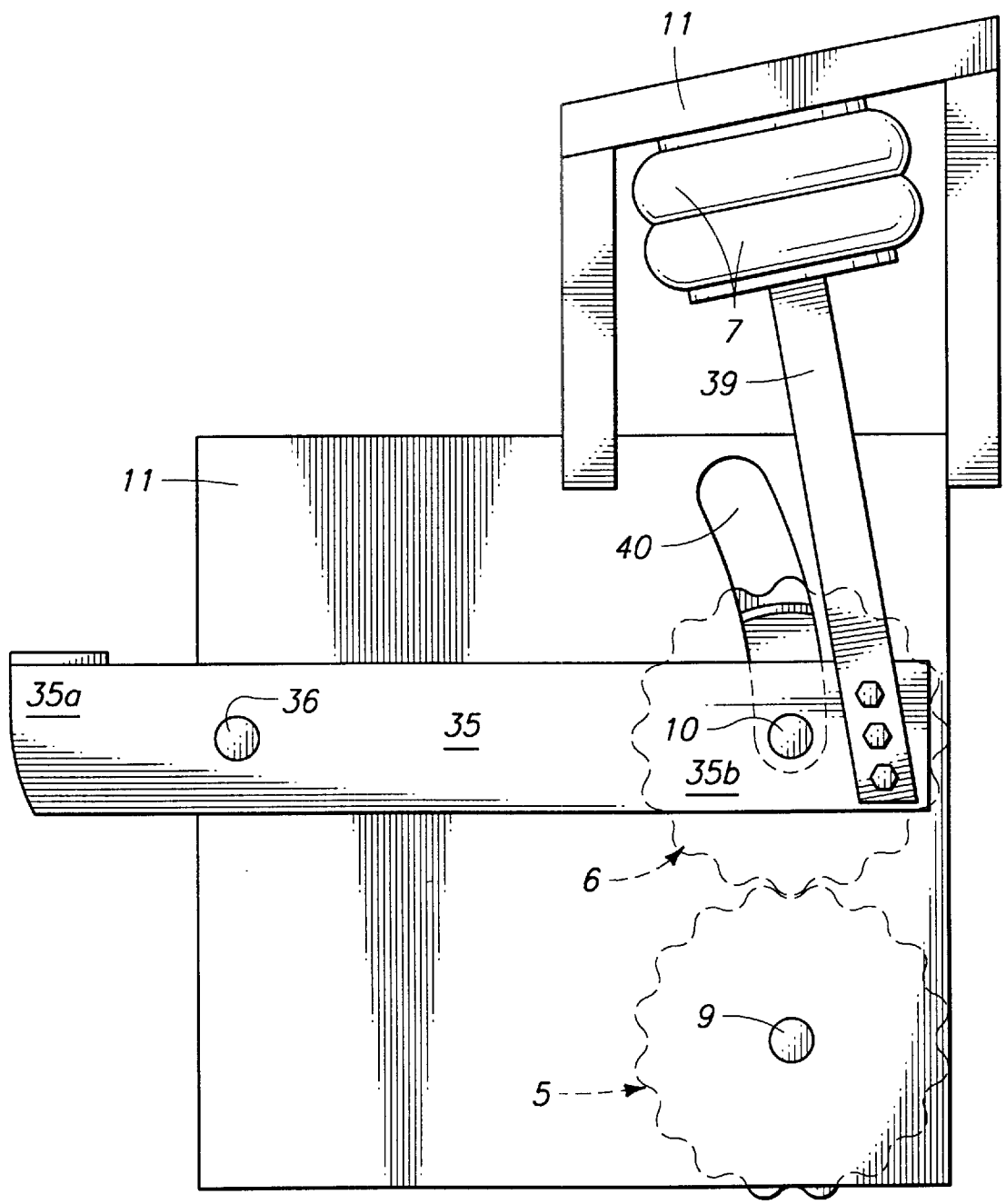

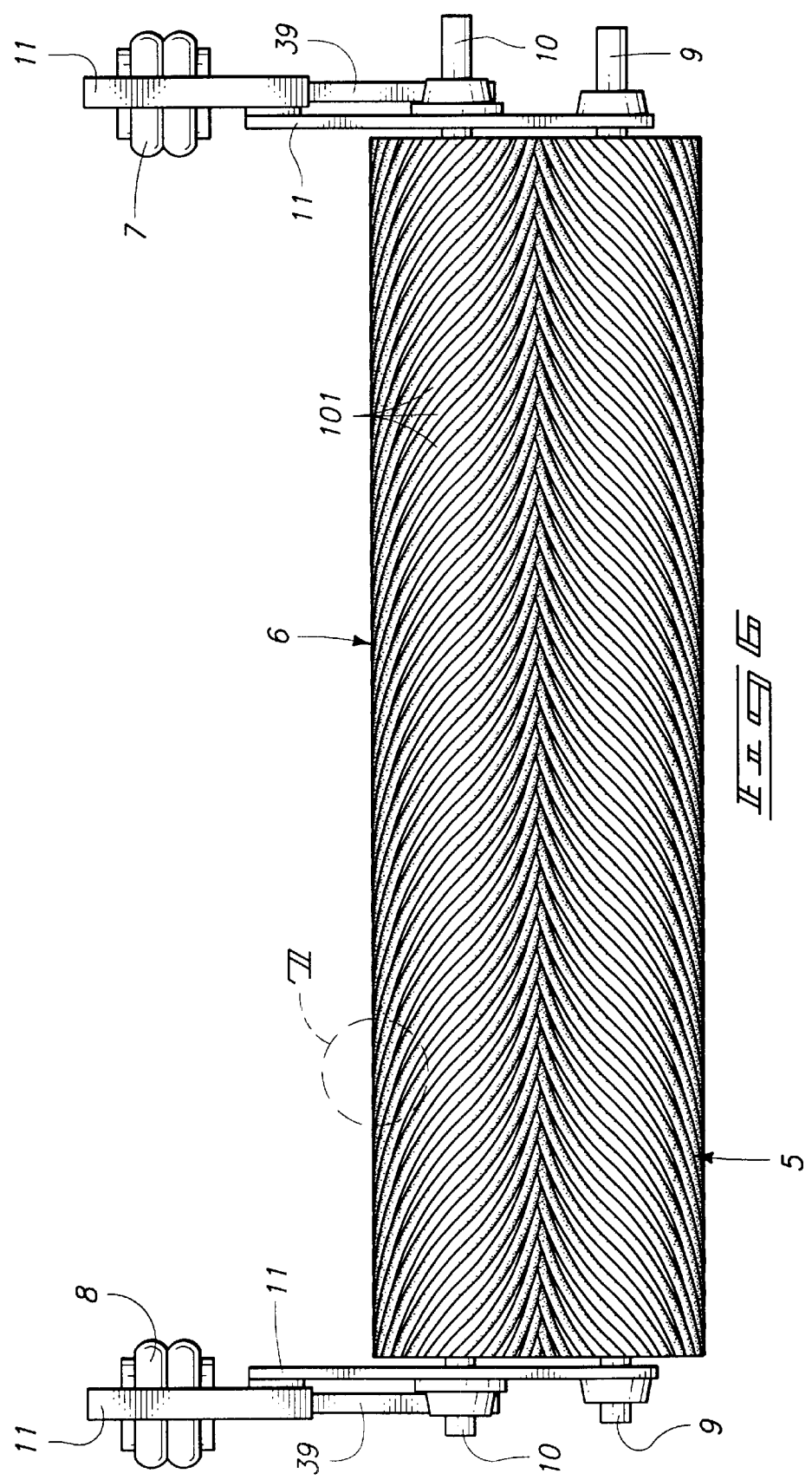

CROP CONDITIONING SYSTEM WITH LOBED ROLLERS

TECHNICAL FIELD

The present invention relates to a system for the conditioning of various crops or foliage, for use in the agricultural and farming industry. The conditioning system facilitates the removal of moisture from the crop and reduces drying time.

BACKGROUND OF THE INVENTION

When a crop such as hay or alfalfa is cut in the field, a windrower or swather is generally utilized. The windrower typically includes cutting surfaces to sever the fiber of the crop and the cut crop is left in a row in the field to dry before it is bailed or otherwise handled.

The time that it takes the crop to dry in the field before it can be bailed or further handled can be critical. It is very important to shorten that time as much as possible to avoid possible problems that may be encountered with the crop.

Devices referred to as conditioners are generally utilized to reduce the moisture in the crop, and/or to facilitate the faster drying of the crop. Conditioners are oftentimes mounted on a windrower, mower or other device, or they may be a separate unit. Conditioners currently available typically crimp and/or break down the stem of the hay and assist in the removal, or the facilitation of the moisture, in the fiber of the crop.

Conditioners typically include two or more elongated parallel rollers, slightly spaced apart from one another. The respective adjacent rollers rotate in opposite directions from one another such that the crop is fed through the gap between the two rollers. The rollers are typically made of steel, but with a rubber, elastomer or other compressible surface or coating around the circumference.

Conditioners or conditioning equipment may be operated as stationary equipment, mobile equipment, or combined with crop harvesting or swathing equipment.

It is therefore an object of this invention to provide and improved crop conditioning system, and more particularly, an improved roller for use in a crop conditioning system.

BRIEF DESCRIPTION OF THE DRAWINGS

Preferred embodiments of the invention are described below with reference to the following accompanying drawings.

FIG. 2 is a rear elevation view of one embodiment of a two roller conditioner configuration as contemplated by this invention;

FIG. 3 is a side elevation view of one embodiment of a two roller configuration, with bellows, as contemplated by this invention;

FIG. 6 is a rear elevation view of one embodiment of a two roller conditioner configuration as contemplated by this invention, showing an example of the lobes wherein the lobes are not parallel to the axis of the roller;

DETAILED DESCRIPTION OF THE PREFERRED EMBODIMENTS

Many of the fastening, connection, process and other means and components utilized in this invention are widely known and used in the field of the invention described, and their exact nature or type is not necessary for an understanding and use of the invention by a person skilled in the art or science, and they will not therefore be discussed in significant detail. Furthermore, the various components shown or described herein for any specific application of this invention can be varied or altered as anticipated by this invention and the practice of a specific application of any element may already be widely known or used in the art or by persons skilled in the art or science and each will not therefore be discussed in significant detail.

The term framework is generally used herein to refer to any framework or structure which houses, supports, or provides the framework for the rollers and other components of this invention. It is meant to be construed broadly and it not limited to any specific embodiment. For example, this conditioner can be used in combination with numerous different types of existing equipment, such as swathers, windrowers, or even pulled behind a tractor as an independent conditioner. Therefore as merely one example, a header on existing equipment may serve as the framework or part of the framework for this invention.

There are numerous ways known to those of ordinary skill in the art to provide rotational drive to the rollers, such as motors, hydraulic motors, engines, or any other source of rotation, none in particular of which are required to practice this invention, and will not therefore be discussed in any greater detail.

Applicant hereby incorporates by reference his commonly owned U.S. Pat. No. 6,050,070, issued Apr. 18, 2000, as though fully set forth herein.

Figure 1:
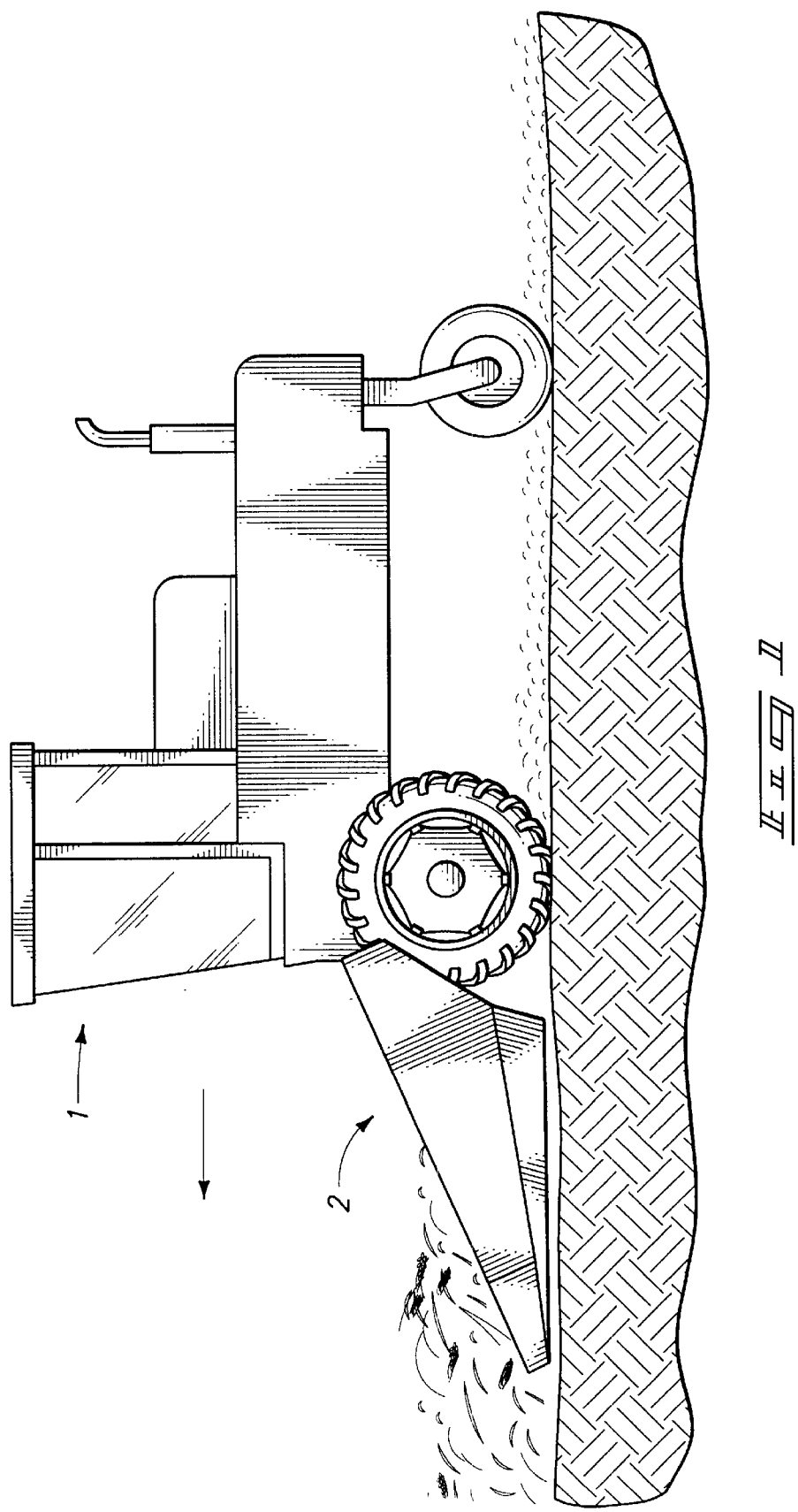
FIG. 1 is an elevation view of typical farm equipment which may either include a conditioner or to which a crop conditioner may be attached.

FIG. 1 illustrates typical farm equipment which may either include a conditioner or to which a crop conditioner may be attached. Figure one illustrates a self propelled windrower 1 with a forwardly mounted crop cutting and conditioning assembly 2.

FIG. 2 is a rear elevation view of one embodiment of a two roller conditioner configuration as contemplated by this invention. Fixed roller 5 is securely attached to framework 11 and rotates with and about fixed roller axis 9. Moveable roller 6 is movably mounted relative to framework 11 and is approximately parallel to and abutting the fixed roller 5. Moveable roller 6 rotates about moveable roller shaft 10. While the rollers shown are generally cylindrical in shape, they need not be.

First bellow 7 is mounted to framework 11 and second bellow 8 is also mounted to framework 11. Moveable roller 6 is mounted to bellow connector arms 39 through which the force of first bellow 7 and second bellow 8 are imparted on moveable roller 6 toward fixed roller 5 (through a bearing).

This invention is not limited to a two-roller configuration, but includes a two-roller configuration, three-roller configuration, four-roller configuration, and additional configurations, all within the scope of this invention.

Fixed roller 5 and moveable roller 6 are preferably rotatably mounted utilizing spherical bearings. In operation, the rollers may each rotated in the range of three hundred (300) revolutions per minute to three thousand (3000) revolutions per minute. However it should be noted that no particular number of revolutions per minute is necessary to practice this invention.

The movable roller 6 is shown mounted in force receiving disposition to the bellows such that the force from the bellows is imparted on the movable roller 6 to push it toward the fixed roller 5. Although it is preferred that the movable roller 6 be mounted to bellows through the bellows connector arm, it is not necessary to practice this invention so long as the movable roller is in direct or indirect force receiving disposition to the bellows.

The movable roller 6 is also placed in slidable relation to the framework and mounted approximately parallel to the fixed roller. Since roller 6 is movable, it slides with respect to the framework 11 and with respect to the fixed roller 5.

FIG. 3 is a side elevation view of one embodiment of a two roller configuration, with bellows, as contemplated by this invention. FIG. 3 illustrates framework 11, bellows 7 mounted to framework 11, along with bellows connector arm 39 mounted to pivot arm 35. Pivot arm 35 is pivotally mounted to framework 11 about pivot arm mount point 36.

FIG. 3 illustrates a moveable roller guide 40 or slot in framework 11. FIG. 3 further shows fixed roller 5, fixed roller axis 9, moveable roller 6, rotatably mounted about and with moveable roller axis 10.

FIG. 3 further shows an additional mechanism which allows the moveable roller 6 to be separated from the fixed roller 5 to provide a sufficient gap between the two rollers to allow objects and debris to pass through.

In applications in which the framework 11 is mounted on the header of the conditioner for example, the header may be raised by the operator of the conditioner.

The combination of the bellows and the application of force by the bellows, result in a better breakdown of the cellulose layer on the surface of the crop such as hay, being crushed. The substantial crushing (as opposed to merecrimping) of this outer surface, allows the moisture contained within the plant, to be released much faster and more thoroughly.

Figure 4:
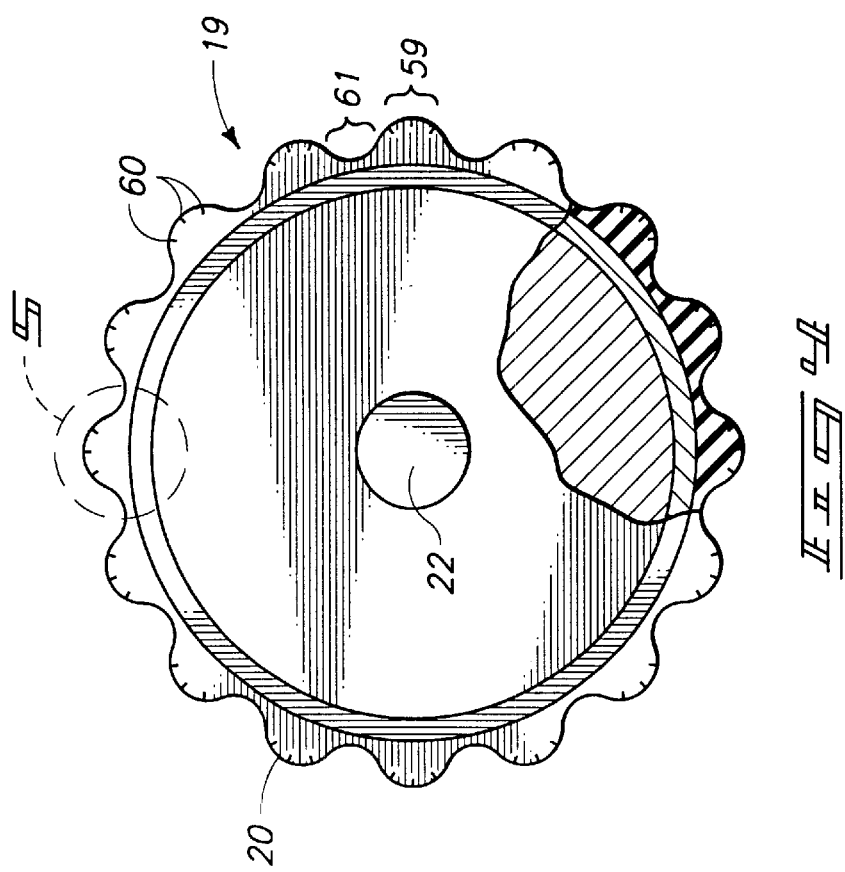
FIG. 4 is an elevation view of one embodiment of a roller as contemplated by this invention.

FIG. 4 is a side elevation view of one embodiment of a roller as contemplated by this invention. FIG. 4 illustrates one example of a roller 19 with a steel core rotatably mounted about roller axis 22. It should be noted that any type of roller or core may be used within the contemplation of this invention. The steel core preferably has a compressible surface 20 or roller sleeve, mounted on it, such as rubber, elastomer or neoprene. The compressible surface 20 may be vulcanized, molded or glued onto the roller, with no one method of attaching or fixing the compressible surface 20 being required to practice this invention.

While it is preferred for the rollers to have a rubber, neoprene or other compressible surface, it is not necessary to practice this invention, as other or combinations of surfaces may also be used.

FIG. 4 illustrates the generally arcuate lobed or raised areas 59, slits 60 and recessed areas 61. FIG. 3 illustrates how the lobed areas and recessed areas on one roller interact with and complement the lobed areas and recessed areas on a second roller. In the embodiment shown, the lobed or raised areas, and the recessed areas, are generally arcuate, however they need not be.

Figure 5:
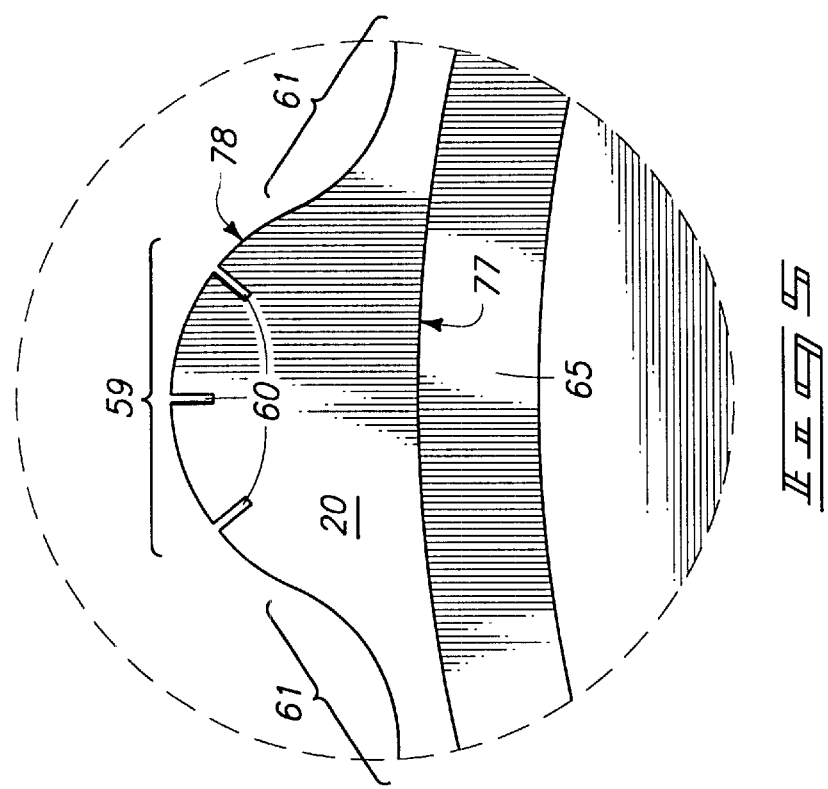
FIG. 5 is the detail 5 view from FIG. 4, and illustrates an embodiment of this invention.

FIG. 5 is the detail 5 from FIG. 4 and better illustrates the compressible base mat 20, showing slits 60, lobed or raised area 59 and the recessed areas 61. The outer surface is generally arcuate across and between both the lobed or raised areas 59 and the recessed areas 61. The compressible base mat 20 generally includes a first side 77 which is attached to the roller, and a second side 78 which is the outer or exposed side of the compressible base mat 20.

The term generally arcuate as used herein is intended to cover not only smooth curves, but also those shapes which have points through which a curve or arc may be drawn although the surface is not smooth.

The slits 60 in the raised areas 59 of the compressible surface 20 generally run the length or substantial length of the working area of the roller for maximum benefit. The slits shown in FIG. 5 are shown wider than would be preferred for purposes of illustration, but in practice may range from one-half of an inch in width down to virtually no measurable distance if the slit is cut thin enough such that the surrounding rubber comes back together until put under pressure during conditioning. The slits 60 may be shallow or cut all the way to the roller body, or any distance in between the two. As can be seen from the figures, the slits 60 are generally oriented longitudinally on the roller.

The slits 60 in the raised areas 59 help condition the crop, forage or hay being fed through and between adjacent rollers. As the crop is being fed through adjacent rollers, one roller is rotating clockwise and a second roller is rotating counter-clockwise (better shown in FIG. 3), with the raised areas on the first roller being relatively and approximately synchronized (complementary or interpositioning with respect to) with the corresponding recessed areas on the compressible surface of the second roller.

FIG. 6 is a rear elevation view of one embodiment of a two roller conditioner configuration as contemplated by this invention, showing an example of the lobes wherein the lobes are not parallel to the axis of the roller. FIG. 6 illustrates many of the same components as shown in FIG. 3 (which are identified by like item numbers), but with the longitudinal direction of the lobes being other than parallel to the axis of the roller 6. The lobes 101 on adjacent rollers still complement one another, as better shown in FIG. 3.

Figure 7:
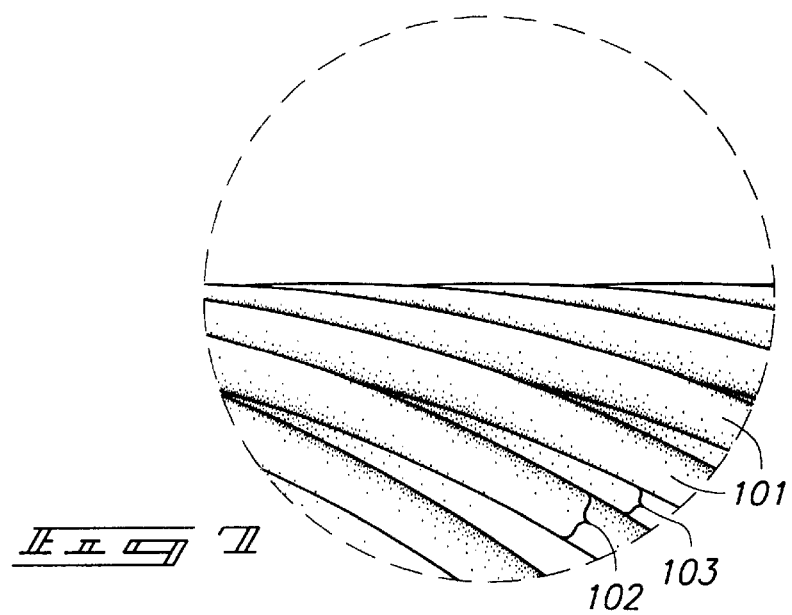
FIG. 7 is detail view of the lobes as shown in FIG. 6.

FIG. 7 is detail view of the lobes as shown in FIG. 6, showing lobes 101, raised areas 102 and recessed areas 103.

Figure 8:
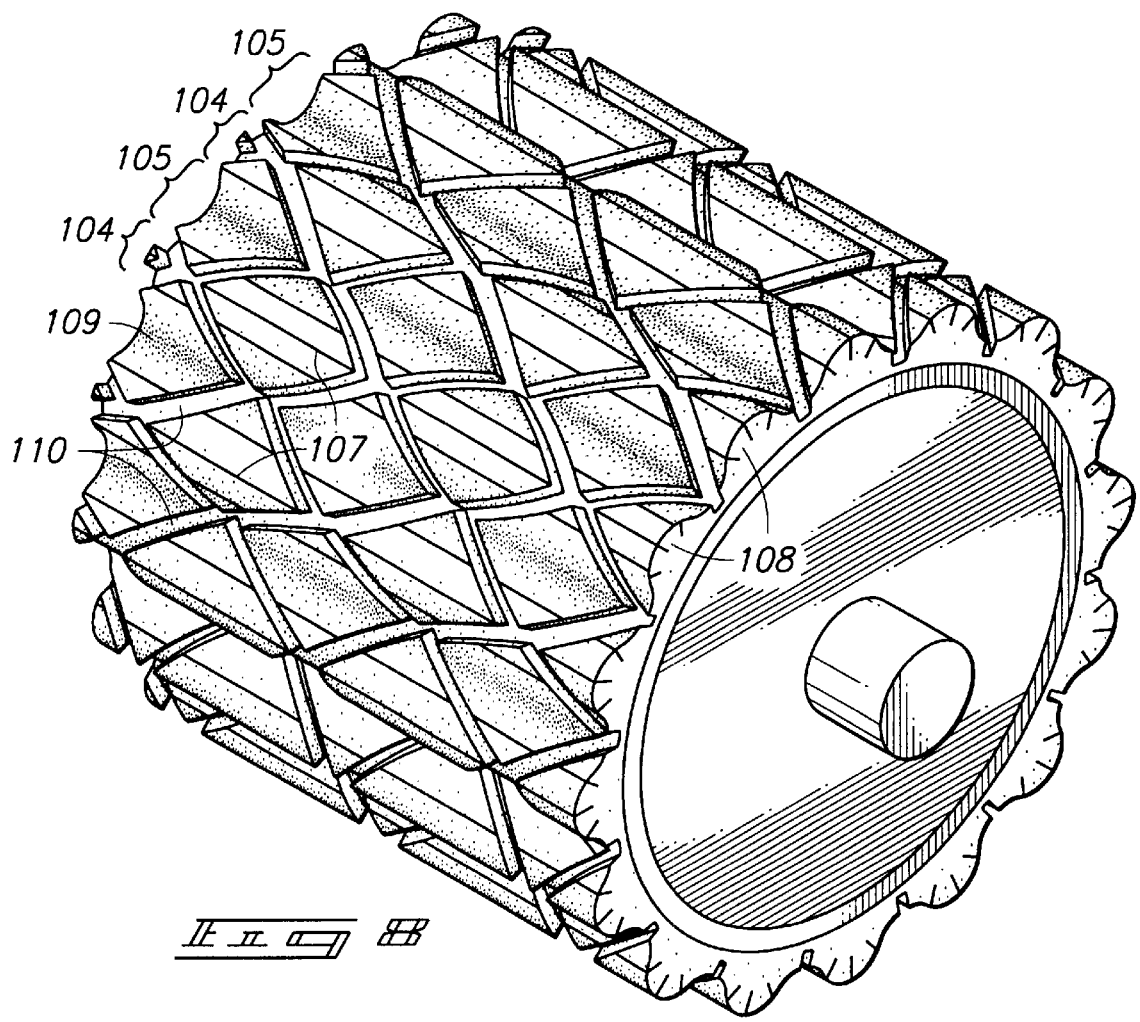
FIG. 8 is a partial perspective view of one embodiment of a two roller conditioner configuration as contemplated by this invention, illustrating a raised platform configuration on the lobes.

FIG. 8 is a partial perspective view of one embodiment of a two roller conditioner configuration as contemplated by this invention, illustrating a raised diamond-shaped platform configuration on the lobes 108. FIG. 7 illustrates lobes 108 with raised areas 104 and recessed areas 105, similar to those shown in FIGS. 4 & 5. The slits 107 are similar to those shown in FIG. 4 and FIG. 5.

FIG. 8 further illustrates the raised platforms 109 and a corresponding base surface 110, as more fully disclosed in jointly owned U.S. Pat. No. 6,050,070, issued Apr. 18, 2000 (which has been incorporated herein by reference).

An embodiment of the invention as disclosed herein provides a roller for use in combination with a crop conditioner, comprising: a roller body with a compressible base mat around the outer surface of the roller body, the compressible base mat including a first side and a second side, the first side of the base mat being secured to the roller; the second side of the base mat being comprised of: a plurality of generally arcuate recessed areas; and a plurality of generally arcuate raised areas, each generally adjacent to one of the plurality of generally arcuate recessed areas, and each generally including one or more longitudinally oriented slits therein.

Further and additional embodiments of this invention is a roller for use in combination with a crop conditioner as stated above, and wherein the compressible base mat is secured to the roller body by vulcanization; and/or a roller for use in combination with a crop conditioner wherein the second side of the base mat is further comprised of: a base surface; and a plurality of platform surfaces on the base surface.

A alternative embodiment of this invention provides a roller for use in combination with a crop conditioner, comprising: a roller body with a compressible base mat around the outer surface of the roller body, the compressible base mat including a first side and a second side, the first side of the base mat being secured to the roller; he second side of the base mat being comprised of: a plurality of generally arcuate recessed areas; and a plurality of generally arcuate raised areas, each generally adjacent to one of the plurality of generally arcuate recessed areas, and wherein the second side of the base mat is further comprised of: a base surface; and a plurality of platform surfaces on the base surface.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A roller for use in combination with a crop conditioner, comprising:
   a. a roller body with a compressible base mat around the outer surface of the roller body, the compressible base mat including a first side and a second side, the first side of the base mat being secured to the roller;
   b. the second side of the base mat being comprised of:
      i. a plurality of generally radially arcuate recessed areas; and
      ii. a plurality of generally radially arcuate raised areas in a lobe configuration, each generally adjacent to one of the plurality of generally arcuate recessed areas, and each of the plurality of generally arcuate raised areas including one or more longitudinally oriented slits therein.

2. A roller for use in combination with a crop conditioner as recited in claim 1, and wherein the compressible base mat is secured to the roller body by vulcanization.

3. A roller for use in combination with a crop conditioner as recited in claim 1, and wherein the second side of the base mat is further comprised of:
   a base surface; and
   ii. a plurality of platform surfaces on the base surface.

4. A roller for use in combination with a crop conditioner as recited in claim 1, and wherein the plurality of generally arcuate recessed areas and the plurality of generally arcuate raised areas being in a spiral configuration around the roller.

5. A roller for use in combination with a crop conditioner, comprising:
   a roller body with a compressible base mat around the outer surface of the roller body, the compressible base mat including a first side and a second side, the first side of the base mat being secured to the roller;
   b. the second side of the base mat being comprised of:
      i. a plurality of generally radially arcuate recessed areas; and
      ii. a plurality of generally radially arcuate raised areas in a lobe configuration, each generally adjacent to one of the plurality of generally arcuate recessed areas, and wherein the second side of the base mat is further comprised of:
         (1) a base surface; and
         (2) a plurality of platform surfaces on the base surface.

6. A roller for use in combination with a crop conditioner as recited in claim 5, and wherein the plurality of generally arcuate recessed areas and the plurality of generally arcuate raised areas being in a spiral configuration around the roller.

* * * * *